United States Patent [19]

Iwama et al.

[11] 4,273,426
[45] Jun. 16, 1981

[54] MOTION PICTURE SYSTEM

[75] Inventors: Hideto Iwama, Kawasaki; Masamichi Toyama; Mamoru Shimazaki, both of Machida; Toshikazu Ichiyanagi, Tokyo, all of Japan

[73] Assignee: Canon Kabushiki Kaisha, Tokyo, Japan

[21] Appl. No.: 814,850

[22] Filed: Jul. 11, 1977

[30] Foreign Application Priority Data

Jul. 14, 1976 [JP] Japan .................................. 51-83750

[51] Int. Cl.³ ............................................ G03B 21/38
[52] U.S. Cl. ...................................... 352/169; 352/174
[58] Field of Search ................ 352/121, 137, 169, 174

[56] References Cited

U.S. PATENT DOCUMENTS

| | | | |
|---|---|---|---|
| 3,705,764 | 12/1972 | Reinsch | 352/121 |
| 3,762,806 | 10/1973 | Roth et al. | 352/137 |
| 3,898,000 | 8/1975 | Kobayashi | 352/169 |
| 3,971,053 | 7/1976 | Maida | 352/169 |
| 4,003,646 | 1/1977 | Freudenschuss et al. | 352/169 |
| 4,036,555 | 7/1977 | Maida | 352/137 |
| 4,046,464 | 9/1977 | Shimazaki et al. | 352/169 |

*Primary Examiner*—L. T. Hix
*Assistant Examiner*—S. D. Schreyer
*Attorney, Agent, or Firm*—Toren, McGeady and Stanger

[57] ABSTRACT

In the disclosed motion picture system a shutter drive control circuit renders it possible to operate a rotary shutter in various exposure control modes including a mode in which rotation of the shutter is stopped for each long exposure of motion picture frame, the system can defer release of the shutter to the exposure aperture closed position pending completion of a picture frame exposure in any of the modes. The system terminates the preceding manual actuation of a shutter trigger when the taking of the particular picture frame is in progress.

3 Claims, 6 Drawing Figures

MOTION PICTURE SYSTEM

BACKGROUND OF THE INVENTION

1. Field of the Invention

This invention relates to motion picture systems, and more particularly to a shutter drive control circuit. The circuit enables the system to make a motion picture of uniform quality to the last frame of a sequence for each cycle of actuation followed by release of a shutter trigger however long the exposure time selected.

2. Description of the Prior Art

Motion picture cameras are generally provided with a rotary shutter having a cutout at an open angle of about 150° and which is driven for continuous rotation at a selectively controlled speed corresponding either to 18 frames/sec. for normal operation (in the case of 8 m/m cameras), or to 9 frames/sec., or to 24 or 25 frames/sec. for slow motion reproduction. To effect uniformity in quality of the motion picture taken with different frame speed, it is necessary to control the size of opening of a diaphragm aperture in accordance not only with the preselected frame speed or exposure time but also with the sensitivity of the film used and the level of brightness of a scene being photographed.

With such a motion picture camera it may be impossible to derive proper exposures for all photographic situations which may be encountered because the required diaphragm aperture may not be available in for a low light level. Attempts have been made to extend the dynamic range of the camera toward low light levels by increasing the angle of an opening of the shutter up to 220° for example. A further large increase of the opening angle can not be realized because of the lack of design flexibility in the shutter structure itself and because of the difficulty of establishing an effective cooperation between a shutter mechanism and an intermittent film advancing mechanism. For these reasons, the dynamic range of exposure control for a motion picture camera is not as extensive as desired.

It is known to provide a motion picture system employing a one-shot control circuit with magnetic means which enables the shutter to be stopped for each initiation of a frame exposure and to remain stationary for a predetermined time interval and then to be driven for further rotation at the termination of duration of the predetermined time interval. In this conventional type of motion picture system, initiation of driving of the shutter is controlled directly by actuation and release of a shutter trigger, and the operator releases the shutter trigger in order to terminate a continuous series of frame exposures. However when the release of the trigger coincides with the making of the last frame of that series, no correct exposure can be made for the last frame.

SUMMARY OF THE INVENTION

An object of the present invention is to provide a motion picture system which can take a motion picture in various selected exposure control modes including a mode in which a rotary shutter gets stopped until each frame exposure has been completed.

Another object of the present invention is to provide a motion picture system having a shutter drive control circuit which defers release of the shutter for termination of a motion picture sequence pending completion of the last frame exposure of that picture sequence, as the shutter trigger is released when the last frame exposure is in progress.

A further object of the invention is to provide a motion picture system capable of using an accessory device upon attachment to a motion picture camera from the outside thereof to impart an additional exposure control mode into the camera.

These and other objects and features of the invention will become apparent from the following detailed description of an embodiment of the invention taken in conjunction of the accompanying drawings in which:

DESCRIPTION OF THE PREFERRED EMBODIMENT

Figure 1:
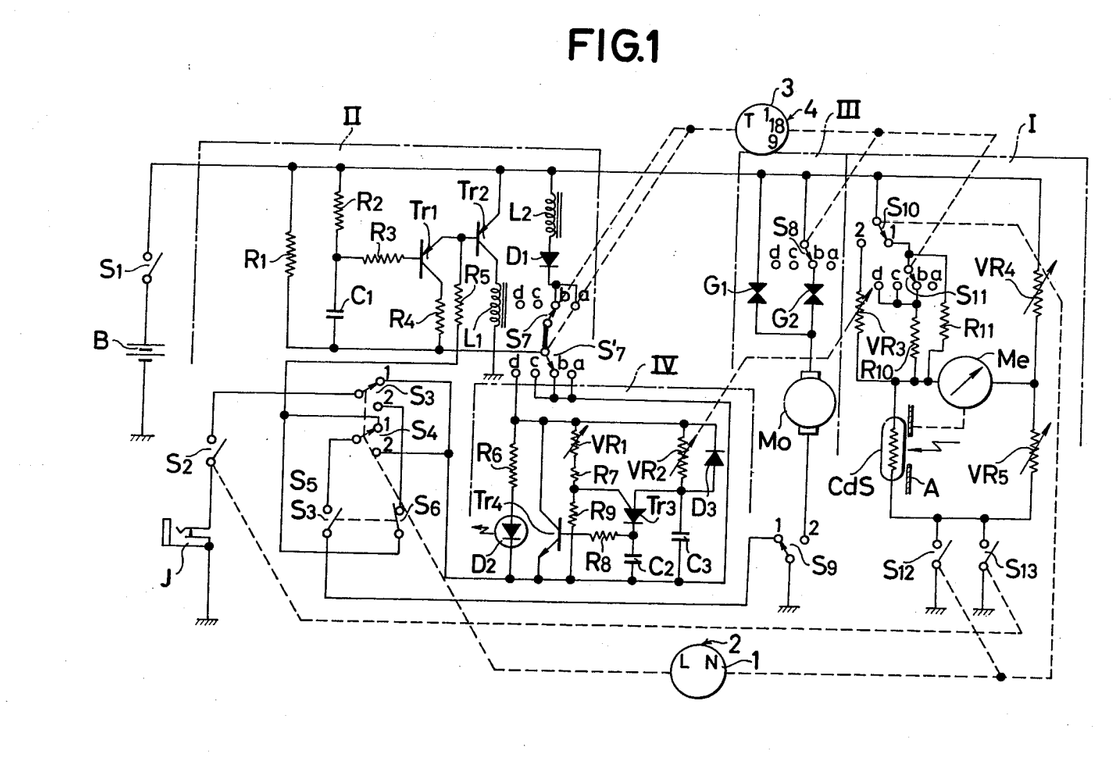
FIG. 1 is an electrical circuit diagram of one embodiment of a motion picture system according to the present invention.
Figure 2:
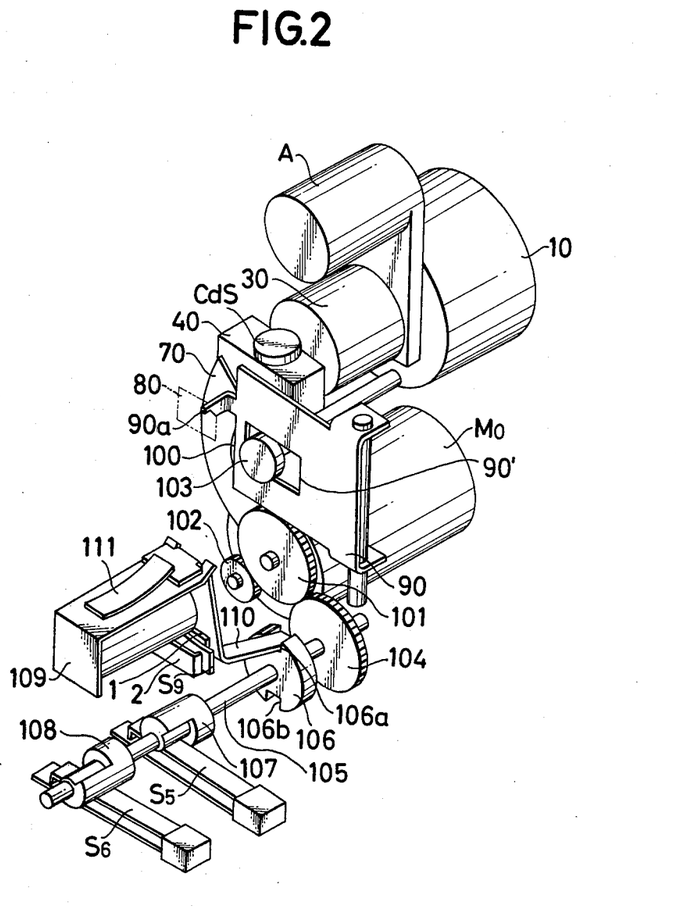
FIG. 2 is a perspective view of the basic parts of a motion picture camera for use in the system of FIG. 1.

FIGS. 1 and 2: illustrate one embodiment of a motion picture system. Here an automatic exposure control circuit I includes a light meter Me operatively associated with a diaphragm control mechanism A (see FIG. 2). A shutter drive control circuit II responds to either or both of the closures of a manually operable release switch S2 and a first automatically operated switch S5. The latter is closed when a rotary shutter 70 (see FIG. 2) is in an exposure aperture full open position. The circuit II causes the shutter 70 to rotate from exposure aperture closed and open positions respectively with an electric motor Mo. The latter has a speed control circuit III which operates through an automatically operated circuit-transfer switch S9 and is responsive to simultaneous occurrence of openings of S2 and S5 for causing rotation of shutter 70 to stop at the aperture closed position. A one-shot control or timer circuit IV is arranged to be brought into cooperation with circuit II when two dials 1 and 3 which are accessible from the outside of the camera housing are turned from their illustrated positions "N" (Normal operation) and "18" (Continuous running at a speed of 18 frames/sec.) to place their respective symbols "L" (Long exposure) and "T" (Successive actuations by the timer circuit) in registry with stationary indices 2 and 4 respectively. This is done so that, upon opening of the exposure aperture, circuit IV starts to operate and at the termination of duration of a predetermined time interval or long exposure, produces a pulse of short duration which is applied to circuit II. This drives shutter 70 so it rotates from the exposure aperture position open past the aperture closed position to the aperture open position at which shutter 70 gets stopped for making a second frame exposure. Such procedure repeats itself until release switch S2 and first switch S5 are simultaneously opened. These circuit portions are explained in detail below.

The automatic exposure control circuit I is in the form of a Wheatstone bridge having four arms. In one arm is a photo-sensitive element CdS positioned to receive light entering through an objective lens 10, 30 (see FIG. 2) of the camera and through the aperture opening of the diaphragm A. In the second arm is a resistor network for setting a desired frame speed or exposure time and consisting of two fixed resistors R10 and R11 and one variable resistor VR3. The resistors are selected for connection into the bridge circuit by switch elements S10 and S11 with switch S10 set in a position "1", switch S11 may be set in either a position "a" for 9 frames/sec., or position "b" for 18 frames/sec., position "c" for single frame operation by each actuation of release S2, or position "d" for a continuous series of frame exposures of the same exposure time as that of 18 frames/sec. between successive unexposed intervals controlled by circuit IV. In these positions resistor R11 or a combination of resistors R10 and R11 connected in parallel with each other is respectively rendered effective. When S10 is set to a position "2", S11 is cut off from circuit I and instead variable resistor VR3 is brought connected to provide a range of long exposure times. The switch element S10 is ganged or assembled with other three switch elements S3, S4 and S12 to be simultaneously switchable by dial 1, and switch element S11 is ganged or assembled with other three switch elements S7, S7' and S8 to be simultaneously switchable by dial 3. A third variable resistor VR4 serves for setting filter information. A fourth variable resistor VR5 sets the film speed.

In response to the output of bridge circuit, meter Me deflects its pointer to a position representing a proper diaphragm value. One of the input terminals of circuit I is grounded through S12 and a switch S13, the latter being arranged to be closed when a shutter trigger is depressed to a first stroke.

Timer circuit IV includes a first timing circuit composed of a variable resistor VR2 and a capacitor C3 for generating a time variable voltage capable of reaching a trigger voltage for a unijunction transistor Tr3 during an interval of time equal to the preselected long exposure time, provided that resistor VR2 is rendered operative with resistor VR3 as schematically shown by dashed lines. Upon conduction of unijunction transistor Tr3, a transistor Tr4 having a base connected through a resistor R8 to a point between the cathode of Tr3 and a timing capacitor C2 is rendered conductive. The transistor Tr4 is allowed to remain conductive during an interval of time varied by a variable resistor VR1. Conduction of unijunction transistor Tr3 also causes discharging of the charge on capacitor C3. Resistors R7 and R9 are connected in series and to variable resistor VR1 between the positive and negative buses of circuit IV. Connected across the collector and emitter of transistor Tr4 is a display circuit consisting of a resistor R6 and a light-emitting diode D2 connected in series with each other so that upon energization of diode D2, the operator is informed of the fact that the timing operation is in progress.

Motor speed control circuit III comprises two mechanical-to-electrical governors G1 and G2 connected in parallel between the positive bus connected to the positive terminal of an electrical power source or battery B through a switch S1 and one end of the winding of motor Mo. The opposite end of the motor Mo is grounded through circuit-transfer switch S9 which is controlled in position by an assembly of electromagnet elements L1 and L2 of circuit II. The second governor G2 is rendered effective only when switch S8 is in position "b" for 18 frames/sec.

Shutter drive control circuit II includes a resistor R1, a short duration timing circuit with a resistor R2 and a capacitor C1 connected in series and across resistor R1. A switching circuit is responsive to the output of the timing circuit for energizing the solenoid L1 having a strong magnetic attraction force. The switching circuit comprises a first transistor Tr1 with a base connected through a resistor R3 to a point on connection between R2 and C1, and having a collector connected through a resistor R4 to the movable contact of switch element S7'. A second transistor Tr2 has a base connected to the emitter of first transistor Tr1, an emitter connected to the positive bus, and a collector connected to the solenoid L. The opposite end of the solenoid is grounded. One end of a second solenoid L2 with a weak magnetic attraction force is connected to the positive bus. The opposite end of the solenoid L2 is connected through a diode D1 to a common lead of fixed contacts "a" and "b" of switch element S7. From there the solenoid L2 is connected either to the output of circuit IV appearing at the fixed contact "d" of switch element S7', or to the negative bus of circuit IV. When dial 1 is in the "N" position, S3 is the position "1", and the negative bus of circuit IV is connected to S2. Also the switch A is in the position "1" so the base of transistor Tr2 is connected through a resistor R5 to first shutter responsive switch S5. With dial 1 in the "L" position, when the shutter is in the aperture closed position where S5 is open and S6 is closed, energization of first solenoid L1 is controlled by release switch S2. When the shutter is in the aperture full open position where S5 and S6 are closed and open respectively, energization of first solenoid L1 is controlled by the output of timer circuit IV, provided that dial 3 is in the "T" position.

FIG. 2 shows an example of arrangement of first and second shutter phase responsive switches S5 and S6, the circuit-transfer switch S9 and an assembly of the first and second electro-magnet elements L1 and L2 along with a shutter arresting mechanism, as applied to a 8 m/m cine-camera. Here the diaphragm A is positioned in a space between the front and rear parts 10 and 30 of the objective lens through which light coming from a scene being photographed passes to a beam splitter 40. A fraction of the light at the beam splitter is deflected to the light-sensitive element or cadmium sulfide CdS. A disc-shaped shutter 70 mounted on a shaft not shown between the beam splitter 40 and a window 80 is provided with a suitable cutout which permits light exiting from the beam-splitter 40 to reach the window 80 once during each revolution of the shaft. A motion picture film not shown is intermittently advanced along a path which extends behind the window 80 by a pulldown 90. On the latter, a claw 90a arranged to enter the perforations of film and upon rotation of the shutter 70 moves the film downwardly, as viewed in FIG. 2, the length of a frame and at a frequency. The latter is controlled by the circuit of FIG. 1 through a cam mechanism. In the cam mechanism a triangle-like disc cam 103 is mounted on the shaft of the shutter 70 and a cam follower member is constructed in the form of a cutout 90' provided through the body of pulldown 90. The operative connection between the shutter 70 and the motor Mo comprises a gear 100 which is fixedly mounted on the shaft and engages an intermediate gear 101, and a pinion 102 which engages with the intermediate gear 101 and is affixed to the output shaft of the motor Mo.

A mechanism arrests the rotating shutter 70 at one of either accurately controlled positions wherein the window 80 is either exposed or unexposed over the entire area thereof. In this mechanism a gear 104 engages an intermediate gear 101 and is fixedly mounted on a shaft 105. A control disc 106 is fixedly mounted on the shaft 105 and has two radial recesses 106a and 106b spaced from each other by angular distances of 180°. Engagement of the recesses with a stop lever 110 arrests the shutter 70 at the respective fully closed and open exposure aperture positions as the shaft 105 rotates in phase synchronizing relation to the shaft of the shutter 70. To control the periods of actuation of switches S5 and S6 in differential relation to each other, respective actuators in the form of rotatable cams 107 and 108 are fixedly mounted on the common shaft 105 in laterally spaced relation to each other. Each periphery and a recess, the recesses of cams 107 and 108 being so oriented that so long as the shutter 70 remains in the aperture closed positions, the first and second switches S5 and S6 are open and closed respectively, and vice versa. The stop lever 110 is fulcrumed at a forward edge of a L-shaped frame structure 109 for the electromagnetic element assembly L1 and L2. Upon energization of at least the first element L1 the lever 110 is moved away from the control disc at one of the recesses 106a and 106b against the force of a plate spring 111 with simultaneous actuation of switch S9 for causing energization of motor Mo. The spring 111 is so weak that the stop lever 110 after retracted can be maintained stationary in the retracted position by the energized electromagnet element L2 alone, thereby saving the consumption of electrical energy of the battery B which would be otherwise necessary to energize the first electromagnet L1 as in the process of taking a motion picture at a speed of 18 or 9 frames/sec.

The operation of the system of FIGS. 1 and 2 is as follows:

(1) For a series of exposures at a normal frame frequency of 9 or 18 frames/sec., the operator may turn dials 1 and 3 to place symbols "N" and "9" or "18" in registry with indices 2 and 4 respectively. After the main switch S1 is closed, a shutter release button not shown is depressed to a first stroke position. This closed switch S13 to start automatic formation of the proper diaphragm value in diaphragm means A by circuit I. Upon further depression of the button to a second stroke position, the release switch S2 is closed to establish the following two energization circuits for the first and second solenoids L1 and L2:

B(+)-S1(ON)-Tr2(ON)-L1-E(earth, or ground)

B(+)-S1(ON)-L2-S7(a,b)-S7'(a,b)-S3(1)-S2(ON)-E

In consequence, the solenoids of the release circuit are energized. This causes the electromagnetic means 109 of FIG. 2 to move the stop lever 110 away from the recess 106a of the control disc 106 and sets switch S9 from position "1" to "2" for energization of motor Mo. At the termination of duration of a time interval dependent upon the time constant of timing circuit R2, C1, transistors Tr1 and Tr2 are rendered nonconducting to de-energize first solenoid L1, while second solenoid L2 remains energized to maintain stop lever 110 in the retraced position until the button is released to open switch S2.

In order to terminate a series of exposures at the normal frame frequency, the operator may release the depressed button. This opens the release switch S2 to de-energize the second solenoid L2, and then set the switch S9 to the "1" position. Simultaneously the stop lever 110 engages the recess, and stops the rotation of the shutter. Moreover, the power supply to the motor Mo is cut off to stop the motor Mo. In the system of the present invention, when the series of exposures are terminated, the opaque sector of the shutter when stopped always assumes a position where the aperture is closed thereby.

Now assuming that the shutter 70 is in a position for opening the aperture 80 and that at this time the depression of the button is released, the second solenoid L2 is de-energized, but the lever 110 is in contact with the control disc 106 at its surface under pressure. Hence before the shutter 70 is held in the aperture open position, the switch S9 remains set in the "2" position to continue driving the motor Mo. When the shutter has come to the position where it is latched in the aperture open position, the lever 110 drops down into the notch 106b to switch the switch S9 from 2 to 1, the switch S5 is turned on, while the switch S6 is turned off. This establishes the connection of the base of the transistor Tr2 to earth through the resistor R5 and through the switches S4, S5 and S9, thereupon the transistor Tr2 is rendered conducting to start energization of the main solenoid L1. By the electromagnetic means 109, therefore, the lever 110 is disengaged from the recess 106b, thus riding on the surface of the disc 106 so that the switch S9 is again set to the "2" position for energization of the motor Mo. In such a manner, the motor Mo starts to rotate and rotation of the motor Mo continues until the rotary shutter 70 comes to be held in the aperture fully closed position, because the lever 110 remains in contact with the disc surface 106 to maintain the switch S9 in the "2" position. When the shutter 70 has arrived at the above identified position, the switch S5 is turned off, while the switch S6 is turned on, to inhibit conduction of the transistor Tr2 so that the main solenoid L1 is left de-energized despite of the fact that the switch S9 assumes such position. At this moment, therefore, the lever 110 is engaged with the recess 106a and then the switch S9 is set to the "1" position. As a result the power supply to the motor Mo is cut off and the shutter gets stopped in the aperture closed position to terminate the particular series of exposures. Hence, the safety mechanism of the invention, makes it possible to terminate a series of exposures with the aperture closed by the shutter when the depression of the button is released at any desired time.

(2) For an ordinary single frame exposure, the exposure mode dial 1 is set to "N" position, and the shutter speed (frame frequency) dial 3 is set to "1" position. The switch S7 is then turned off because of the connection to the terminal, c, and the switch S7' is turned on because of the connection to the terminal, c. In this state, the main switch S1 will be closed. When the release button is depressed, its first stroke position results in actuation of the automatic diaphragm control circuit I by the closure of the switch S13 which leads to formation of a proper diaphragm value in a manner similar to that described in section (1).

Upon further depression of the button to the second stroke position, the switch S2 is closed to actuate the electromagnetic release circuit II, whereupon the transistors Tr1 and Tr2 are turned on to energize the first coil L1. The energization of the first coil L1 causes disengagement of the stop lever 110 from the recess 106a which in turn causes switching of the circuit-transfer switch S9 to the "2" position for energization of the motor Mo. Because the switch S7 is in Off position, that is, "c" position although the switch S7' is in ON position or "c" position, the second solenoid L2 remains de-energized. In a short time interval dependent upon the timing circuit R2, C1, the transistors Tr1 and Tr2 are turned off. Hence after a single frame has been exposed, when the shutter again assumes the aperture closed position, the stop lever 110 is permitted to engage in the recess 106a with simultaneous occurrence of movement of the switch S9 to "1" position for de-energization of the motor Mo. At this time, the switch S5 turns OFF. Thereafter, it is possible that the switch S9 remains in "1" position for assurance of the single frame exposure for that actuation of the button. If the operator desires to make a number of single frame exposures, the corresponding number of cycles of actuating and releasing operation of the button have to be performed. The operation of the safety mechanism for insuring that the stop lever arrests the shutter in the normal distinct position (the aperture closed position) is similar to that described in connection with Section (1).)

(3) The system may produce a continuous series of exposures with each rest time interval between the successive two exposures being controlled by the timer circuit IV. For this, the dial 1 remains unchanged from the "N" position, and the dial 3 is turned for registration of "T" with the index 4 (switches S7 and S7' are connected to the terminal d). The element S7' now connects the timer circuit IV with the shutter drive control circuit II, while the second solenoid L2 is cut off from the circuit II. Upon full depression of the button, the timer circuit IV starts to operate with power supply through a circuit which can be traced as follows:

B(+)-R1-R7'd-IV-S3(1)-S2(ON)-E

At the termination of duration of the time interval dependent upon the timing circuit VR2, C3, the unijunction transistor Tr3 is gated on causing the capacitor C3 to be discharged. This also causes the transistor Tr4 to conduct so that the switching circuit Tr1, Tr2 starts to operate with initiation of the exposure of a first frame. Subsequent operation proceeds in a manner similar to that described in connection with the single frame exposure.

Conduction of the transistor Tr4 continues for a time interval dependent upon the timing circuit R8, C2. When the transistor Tr4 is turned off, the charging of the timing capacitor C3 starts again. Such a procedure repeats itself so long as the button is depressed.

While the transistor Tr4 is OFF, the impedance of the timer circuit is inserted in series with the electromagnetic release circuit II so that the circuit II is prevented from performing a release operation. This condition is indicated by the energized light-emitting diode LED, until the transistor Tr4 is turned on by the above mentioned operation to short-circuit the both ends of the indicating element or diode D2.

(4) For a long time exposure, the exposure mode dial 1 is set to "L" position. The switches S3, S4 and S10 then are moved from their illustrated positions to their respective "2" positions, and the switch S12 is also turned on in response thereto. Further, the shutter speed dial 3 is set to the "T" position. Therefore, as in Section (3), the switch S7 is OFF, and the switch S7' is set to "d" position so that the timer circuit IV is ready to operate. After each switch is switched in this manner, an exposure time is set in the resistor VR3 by a dial (not shown). Then the main switch S1 is closed to start operation of the automatic exposure control circuit I. A proper diaphragm value which is derived from the long exposure time information set in the variable resistor VR3 is introduced into the diaphragm A through the deflected pointer of the meter Me. Thereafter, a release may be performed to turn on the switch S2 so that the base of the transistor T2 is grounded through a circuit, S2-S3-S6-R5. This turns on the transistor T2 to energize the main solenoid L1. The energization of the main solenoid L1 causes disengagement of the stop lever 110 from the recess 106a and also causes movement of the switch S9 of the motor circuit to the "2" position with the motor Mo being rotated. As the motor Mo rotates in this manner, the shutter blade 70 which is driven by the motor Mo opens the aperture with the switches S5 and S6 being turned on and off respectively to interrupt the energization of the main coil L1. When the shutter has come to a position in which the aperture is fully opened and this condition is retained, the lever 110 engages the recess 106b, and the switch S9 is set to the "1" position, thereby stopping the motor Mo. In this way, the shutter is held in the aperture open position. In this state, the timer circuit IV is rendered operative by the current supply through the switches S7'-S4-S5-S9. A long time exposure is performed with the time constant comprising the variable resistor VR2 in which the long exposure time is set by cooperation with the variable resistor VR3 for setting of long exposure time information of EE circuit and the capacitor C3. When the potential of the capacitor C3 becomes equal to the divided voltage of the voltage divider VR1, R7, R9, the transistor Tr3, Tr4 are turned on to instantaneously energize the main solenoid L1 as described in the above mentioned section (3). Hence the stop lever 110 is taken out of engagement with the recess 106b. At the same time, the switch S9 is connected to the terminal 2 to energize the motor Mo. As the motor rotates, the shutter closes the aperture to terminate the long time exposure and then comes again to a position where the aperture 80 is open at which the shutter is stopped so that the long time exposure determined by the above mentioned timer circuit is performed repeatedly. In other words, when the main solenoid L1 is instantaneously energized to drive the motor for rotation and when the shutter 70 has come to a position where the aperture 80 is closed, the switch S5 is OFF and the switch S6 is ON so that the base of the transistor Tr2 is connected to ground through the switches S2, S3, S6 and through the resistor R5. Hence the transistor Tr2 is turned on to maintain the main solenoid L1 in the energized state and, therefore, the lever 110 is prevented from engaging the recess 106a to permit further rotation of the motor Mo. When the shutter has come again to the aperture open position, the switch S5 turns ON, and the switch S6 turns OFF so that the transistor Tr2 is turned off. Because of the de-energization of the main solenoid L1, when the shutter has rotated to the position where the aperture is open and this condition is retained, the lever 110 engages with the recess 106b with the movement of the switch S9 to the "1" position. At this time, the rotation of the shutter is stopped, and the timer circuit again starts to operate. Thus, the long time exposure determined by the above mentioned timer circuit is performed repeatedly. Further, during the process of controlling the exposure in the above mentioned manner, when the button is released, the switch S2 is opened. But, if the shutter is in the aperture open position, in other words, in progress of the exposure by the timer circuit, the switch S5 is ON and the switch S6 is OFF. Hence the timer circuit IV is supplied with electrical power through the switches S7', S4, S5 and S9. Therefore, even if the button is released, the exposure continues during the exposure time interval controlled by this timer circuit. After said time, as mentioned above, the main solenoid L1 is instantaneously energized to disengage the stop lever 110 from the recess 106b and to set the switch S9 to "2" position. When the shutter has rotated to the aperture closed position, as mentioned above, though the switch S6 is turned on, the switch S2 is in OFF state so that the transistor Tr2 is not actuated for conduction, thus remaining in OFF state and so that the main solenoid L1 remains de-energized. Therefore, when the shutter has rotated to a position at which the shutter is held from further rotation in the aperture closed position, the engagement between the recess 106a and the stop lever 110 is established and the switch S9 is set to "1" position. This terminates the exposure.

Figure 3A:
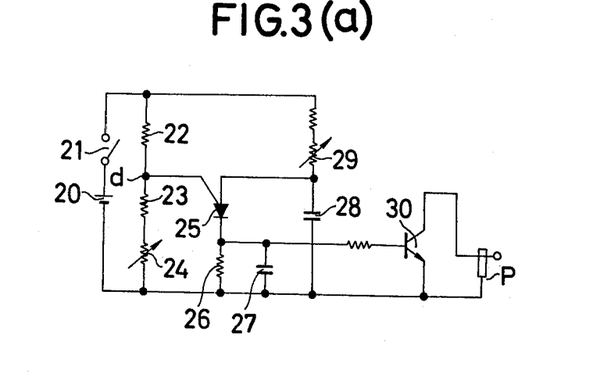
FIG. 3a is an electrical circuit diagram of an example of an interval timer circuit in an accessory form usuable in combination with the circuit of FIG. 1.

FIG. 3(a) shows an example of an interval timer circuit for use with the circuit of FIG. 1. Here, a battery 20 energizes a resistor voltage divider through a main switch 21. The voltage divider is composed of two fixed resistors 22 and 23 and a variable resistor 24. A unijunction transistor 25 has an anode connected to a point d between the resistors 22 and 23 and a cathode connected through a resistor 26 to the negative terminal of the battery 20. A capacitor 27 is connected across the resistor 27. A timing circuit of a variable resistor 29 and a capacitor 28. A transistor 30 has a base connected through a resistor to the capacitor 27, an emitter connected to the negative terminal of the battery 20 and a collector connected to a point on connection between the variable resistor 29 and the capacitor 28. A plug P serves for electrical connection with the jack J of the circuit of FIG. 1.

With this interval timer circuit electrically connected to the circuit of FIG. 1 through the plug P-and-jack J engagement, it is possible to make a continuous series of exposures with each interval of time between the successive exposures being adjusted to a desired value by the variable resistor 29. For this purpose, the operator turns the dials 1 and 3 to place symbols "N" and "1" in registry with the indices 2 and 4 respectively, and then closes the switch S1. By manipulation of a dial (not shown), the switches S2 and S12 are also closed.

Figure 4:
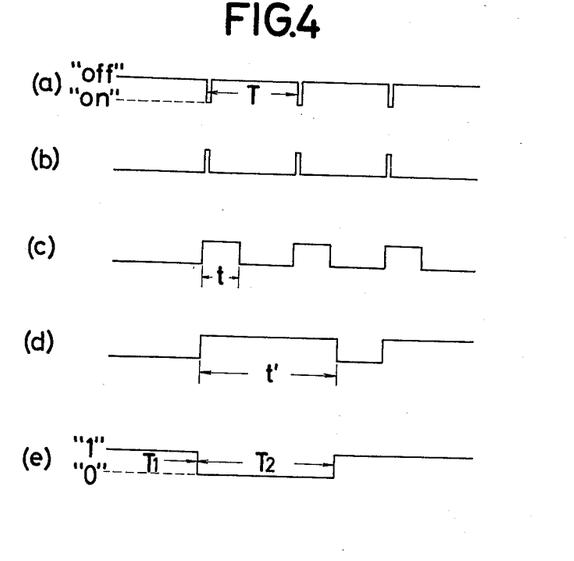
FIG. 4 is a pulse timer chart showing manners in which the circuits of FIGS. 3a and 3b operate with the circuit of FIG. 1.

When the main switch 21 of FIG. 3(a) is closed, the transistor 30 starts to produce a train of negative pulses of short duration as shown in FIG. 4(c). In other words, each time the transistor 30 is rendered instantaneously conducting, a release signal appears at the jack of FIG. 1. The signal causes the main solenoid L1 to be instantaneously energized in a manner similar to that described in connection with the single frame operation, so that the lever 110 is moved away from the recess 106a to set the switch S9 to "2" position for energization of the motor Mo. As the motor Mo rotates, the shutter again comes to a position where the shutter is held from further rotation in the aperture closed position and at which the lever 110 enters the recess 106a with the simultaneous movement of the switch S9 to "1" position. Hence the exposure is terminated. Thereafter, upon conduction of the transistor 30 again, as mentioned above, a single frame exposure is performed. As shown in FIG. 4(b), each time the release signal is applied, a single frame exposure is performed. In FIG. 4(c), t denotes a time interval during which the shutter is open and which is shorter than the period T of the interval timer. When the period T of the interval timer is set to a short time, shutter time t' may be longer than the period T as shown in FIG. 4(d). In this case, the shutter release operation is performed in response not to each release signal of FIG. 4(b), but to the next signal after the completion of the particular single frame exposure.

Figure 3B:
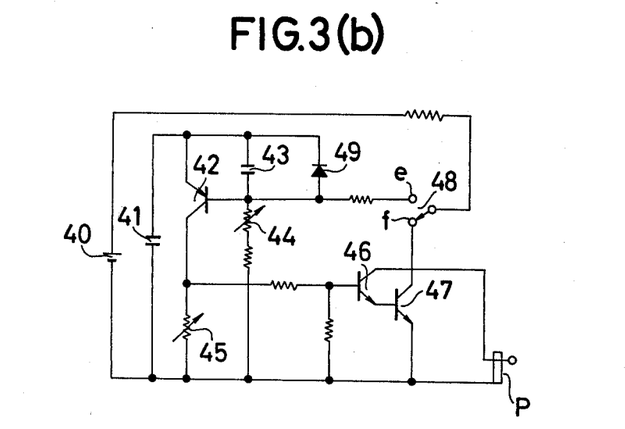
FIG. 3b is an electrical circuit diagram of an example of a self-timer circuit in an accessory form usuable in combination with the circuit of FIG. 1.

FIG. 3(b) shows an example of a self-timer circuit for use an an accessory unit in combination with the circuit of FIG. 1. This circuit comprises a battery 40, a first capacitor 41, a first transistor 42, a second capacitor 43 connected between the emitter and base of the first transistor 42 and, a first variable resistor 44 connected in series with the second capacitor 43. It also includes a second variable resistor 45 connected between the collector of the first transistor 42 and the negative terminal of the battery 40, a circuit-transfer switch 48. The latter includes a movable contact connected to the positive terminal of the battery 40, and two fixed contacts, e, and, f, the contact, e, being connected through a resistor and a diode 49 to both of the emitter of the transistor 42 and the capacitor 41, and the contact, f connected to the common lead of the collectors of second and third transistors 46 and 47 cascade connected to each other. The base of the second transistor 46 is connected through a resistor to a point between the collector of the first transistor 42 and the variable resistor 45. A plug P connected between the collector of the third transistor 47 and the negative terminal of the battery 40.

The operation of the self-timer circuit is as follows: At first, the switch 48 is set to the "e" position where the first and second capacitors 41 and 43 are charged. Thereafter, the switch 48 is set from "e" to "f" position where the second capacitor 43 is charged from the first capacitor 41. Hence, in a predetermined time interval T1 as shown on line (e) in FIG. 4, the first transistor 42 is turned on and the second and third transistors 46 and 47 are also turned on to change the output of the plug P from "1" to "0" level. After that, the charge on the first capacitor 41 is discharged through the transistor 42 and the resistor 45 now, in a predetermined time interval T2, the second and third transistors are turned off to change the output of the plug P from "0" to "1" level.

In operating the self-timer as connected to the circuit of FIG. 1 through the plug P-and-jack J engagement, when the dials 1 and 3 are set to "N" and "9" or "18" positions respectively, and when the switches S2 and S12 are closed by the dial not shown, a counting operation starts and then continues during a time interval, T1. At the termination of duration of the time interval T1, the first and second solenoid L1 and L2 are energized to start release operation. Subsequent operation proceeds in a manner similar to that described above. As the second solenoid L2 is maintained energized during a timer interval T2, a continuous exposure operation is performed during that interval T2. Alternatively, when the dials 1 and 3 are set to "L" and "T" positions respectively, as explained in the aforementioned Section (4), a continuous series of exposures with the exposure time regulated by the timer circuit IV of the camera takes place. In this case, however, if the exposure time interval regulated by the timer circuit IV is longer than the timer interval T2, the exposure is terminated after the time regulated by the timer circuit IV likewise as described in Section (4).

Figure 5:
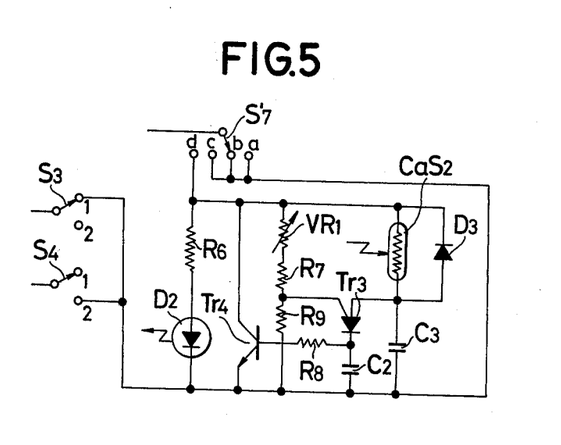
FIG. 5 is an electrical circuit diagram of an example of modification of the one-shot control circuit IV of FIG. 1.

FIG. 5 shows another practical example of the timer circuit IV of FIG. 1, wherein the same reference characters have been employed to denote the similar parts to those shown in FIG. 1. Instead of using VR2, a light-sensitive element CdS2 is used. In that case the shutter is held in the aperture open position during a time interval dependent upon the level of brightness of a scene being photographed. The details of operation of the circuit of FIG. 5 are omitted because it is the same as that of the circuit of FIG. 1.

As has been described in detail above, in the motion picture system of the present invention, it is possible to terminate an exposure after an exposure time regulated by the timer circuit even when a release occurs at a time during the process of performing a long time exposure by the timer circuit, thereby a correct exposure is effected even at the last frame. This and other features of the invention play a very important role in the motion picture camera.

What is claimed is:

1. A motion picture camera for use with film comprising:
    (a) a motor for feeding a film;
    (b) an aperture;
    (c) a shutter mechanism operatively coupled with the motor to control opening and closing the aperture;
    (d) lock means for locking the shutter at a fully opened position or at a fully closed position when the shutter reaches a phase at which the aperture is fully opened and when the shutter reaches a phase at which the aperture is fully closed;
    (e) a trigger switch arranged to be rendered conductive when a picture taking operation is to be performed for effecting a picture taking operation;
    (f) electromagnetic means to cause said locking means to move to the non-locking position when energized;
    (g) first sensor switch means for becoming conductive when said shutter is in the opened position;
    (h) a second sensor switch means for becoming conductive when said shutter is in the closed position;
    (i) a selector member for selecting an interval time exposure mode and a long time exposure mode;
    (j) a timer circuit connected to said electromagnetic means for producing pulses at predetermined intervals when the timer circuit operates, and for applying the pulses to energize said electromagnetic means; and
    (k) selecting switch means operatively coupled to said selector member for connecting said first sensor switch means to said electromagnetic means and supplying a power to said electromagnetic means to energize said electromagnetic means when said first sensor switch means becomes conductive and for connecting said timer circuit to said trigger switch and supplying a power to said timer circuit to energize said timer circuit through said trigger switch in the interval time exposure mode, said selecting switch means also being arranged for connecting said second sensor switch means to said electromagnetic means for supplying a power to said electromagnetic means to energize said electromagnetic means when said second sensor switch means becomes conductive and for connecting said timer circuit to said first sensor switch means and supplying power to said timer circuit through first sensor switch means when said first sensor switch means becomes conductive in the long time exposure mode.

2. A motion picture camera comprising:
    (a) a shutter;
    (b) a motor;
    (c) shutter driving means driven by said motor for driving a shutter between a fully closed position and a fully opened position;
    (d) latching means coupled to the driving means and having a latch position for latching said shutter driving means when said shutter is moved to said fully closed position and fully opened position;
    (e) a motor switch for electrically energizing said motor when said latching means is in a non-latching position;
    (f) electromagnetic means to cause said latching means to move to the non-latching position when energized;
    (g) first sensor switch means which becomes conductive when said shutter occupies said opened position;
    (h) second sensor switch means which becomes conductive when said shutter occupies said closed position;
    (i) a selector member for selecting an interval time exposure mode and a long time exposure mode;
    (j) a timer circuit connected to said electromagnetic means for producing pulses at predetermined intervals when the timer circuit operates, and for applying the pulses to energize said electromagnetic means; and
    (k) selecting switch means operatively coupled to said selector member, said selecting switch means connecting said first sensor switch means to said electromagnetic means for energizing said electromagnetic means when said first sensor switch means becomes conductive and energizing said timer circuit in the interval time exposure mode, and said selecting switch means connecting said second sensor switch means to said electromagnetic means for energizing said electromagnetic means when said second sensor switch means becomes conductive and connecting said timer circuit to said first sensor switch means for supplying power to said timer circuit when said first sensor switch means becomes conductive state in the long-time exposure mode.

3. A motion picture camera comprising:
    (a) a motor for feeding a film;
    (b) an aperture;
    (c) a shutter mechanism operatively coupled to the motor to control opening and closing of the aperture;
    (d) a timer circuit for generating a signal in predetermined cycles;
    (e) latch means coupled to the driving means and having a latch position for latching said shutter at a fully opened position and a fully closed position and having a non-latching position;
    (f) a motor switch for electrically energizing said motor when said latching means is in a non-latching position;
    (g) release means responsive to signals from said timer circuit for causing said latching means to move to the non-latching position when said release means is operated;

(h) first sensor means for sensing the shutter position and producing a signal when the shutter is in the open position, said release means being arranged to operate in response to the signal of said first sensor means;

(i) second sensor means operative in response to the signal of said second sensor means for sensing the shutter position and producing a signal when the shutter is in said closed position;

(j) a selector member for selecting an interval time exposure mode and a long time exposure mode; and (k) a connecting circuit for connecting said first sensor means to said release means in said interval time exposure mode so as to have said release means operable in response to the signal from the first sensor means in said interval time exposure mode, and for connecting said second sensor means to said release means in said long time exposure mode so as to have said release means operate in response to the signal from the second sensor means in the long time exposure mode.

* * * * *